United States Patent
Takeuchi

(10) Patent No.: US 7,181,755 B2
(45) Date of Patent: Feb. 20, 2007

(54) DIGITAL BROADCASTING SYSTEM AND DIGITAL BROADCASTING STATION AND DIGITAL BROADCASTING RECEIVER

(75) Inventor: Koichi Takeuchi, Tokyo (JP)

(73) Assignee: Mitsubishi Denki Kabushi Kaisha, Tokyo (JP)

(*) Notice: Subject to any disclaimer, the term of this patent is extended or adjusted under 35 U.S.C. 154(b) by 1058 days.

(21) Appl. No.: 09/949,917

(22) Filed: Sep. 12, 2001

(65) Prior Publication Data

US 2002/0059636 A1    May 16, 2002

(30) Foreign Application Priority Data

Nov. 15, 2000  (JP)  .............................. 2000-348047

(51) Int. Cl.
  H04N 7/10  (2006.01)
  H04N 7/025  (2006.01)
(52) U.S. Cl. ........................................ 725/32; 725/54
(58) Field of Classification Search ............. 725/39–62
  See application file for complete search history.

(56) References Cited

U.S. PATENT DOCUMENTS 6,507,950 B1* 1/2003 Tsukidate et al. ............. 725/54

2005/0204388 A1* 9/2005 Knudson et al. ............... 725/58

* cited by examiner

Primary Examiner—Christopher Grant
Assistant Examiner—Harun Yimam
(74) Attorney, Agent, or Firm—Birch, Stewart, Kolasch & Birch, LLP

(57) ABSTRACT

The digital broadcasting station describes the first unique information as identification information in addition to the event identification prescribed by ARIB standard as opposed to LIT describing the detailed information of local event. The first unique information is for example a date of amended Julian calendar. Therefore, the digital broadcasting receiver can identify the digital broadcasting program uniquely for a long term based on the event identification and the first unique information. Besides, the digital broadcasting station and the digital broadcasting receiver with the use of program extended information such as LIT are not yet put to practical use and so the existing digital broadcasting receiver had to be changed neither.

11 Claims, 10 Drawing Sheets

| LIT(Local event Information table) | |
|---|---|
| DATA STRUCTURE | NUMBER OF BITS |
| Local_event_information_section() { | |
|     table_id | 8 |
|     section_syntax_indicator | 1 |
|     reserved_future_use | 1 |
|     reserved | 2 |
|     section_length | 12 |
|     FIRST UNIQUE INFORMATION | 16 |
|     event_id | 16 |
|     reserved | 2 |
|     version_number | 5 |
|     current_next_indicator | 1 |
|     section_number | 8 |
|     last_section_number | 8 |
|     service_id | 16 |
|     transport_stream_id | 16 |
|     original_network_id | 16 |
|     for(i=0;i<N;i++) { | |
|         local_event_id | 16 |
|         reserved_future_use | 4 |
|         descriptors_loop_length | 12 |
|         for(j=0;j<M;J++) { | |
|             descriptor() | |
|         } | |
|     } | |
|     CRC_32 | 32 |
| } | |

FIG.2A

| LIT(Local event Information table) | |
|---|---|
| DATA STRUCTURE | NUMBER OF BITS |
| Local_event_information_section() { | |
|     table_id | 8 |
|     section_syntax_indicator | 1 |
|     reserved_future_use | 1 |
|     reserved | 2 |
|     section_length | 12 |
|     FIRST UNIQUE INFORMATION | 16 |
|     event_id | 16 |
|     reserved | 2 |
|     version_number | 5 |
|     current_next_indicator | 1 |
|     section_number | 8 |
|     last_section_number | 8 |
|     service_id | 16 |
|     transport_stream_id | 16 |
|     original_network_id | 16 |
|     for(i=0; i<N; i++) { | |
|         local_event_id | 16 |
|         reserved_future_use | 4 |
|         descriptors_loop_length | 12 |
|         for(j=0; j<M; J++) { | |
|             descriptor() | |
|         } | |
|     } | |
|     CRC_32 | 32 |
| } | |

FIG.2B

| ITT(Index Transmission table) | |
|---|---|
| DATA STRUCTURE | NUMBER OF BITS |
| Index_transmission_section() { | |
|     table_id | 8 |
|     section_syntax_indicator | 1 |
|     reserved_future_use | 1 |
|     reserved | 2 |
|     section_length | 12 |
|     FIRST UNIQUE INFORMATION | 16 |
|     event_id | 16 |
|     reserved | 2 |
|     version_number | 5 |
|     current_next_indicator | 1 |
|     section_number | 8 |
|     last_section_number | 8 |
|     reserved_future_use | 4 |
|     descriptors_loop_length | 12 |
|     for(i=0; i<N; i++) { | |
|         descriptor() | |
|     } | |
|     CRC_32 | 32 |
| } | |

FIG.5A

ERT(Event Relation table)

| DATA STRUCTURE | NUMBER OF BITS |
|---|---|
| Event_relation_section(){ | |
|     table_id | 8 |
|     section_syntax_indicator | 1 |
|     reserved_future_use | 1 |
|     reserved | 2 |
|     section_length | 12 |
|     SECOND UNIQUE INFORMATION | 16 |
|     event_relation_id | 16 |
|     reserved | 2 |
|     version_number | 5 |
|     current_next_indicator | 1 |
|     section_number | 8 |
|     last_section_number | 8 |
|     information_provider_id | 16 |
|     transport_stream_id | 16 |
|     relation_type | 4 |
|     reserved_future_use | 4 |
|     for(i=0;i<N;i++){ | |
|         node_id | 16 |
|         collection_mode | 4 |
|         reserved_future_use | 4 |
|         parent_node_id | 16 |
|         reference_number | 8 |
|         reserved_future_use | 4 |
|         descriptors_loop_length | 12 |
|         for(j=0;j<M;J++){ | |
|             descriptor() | |
|         } | |
|     } | |
|     CRC_32 | 32 |
| } | |

FIG.5B

REFERENCE DESCRIPTOR

| DATA STRUCTURE | NUMBER OF BITS |
|---|---|
| reference_descriptor(){ | |
|     descriptor_tag | 8 |
|     descriptor_length | 8 |
|     information_provider_id | 16 |
|     SECOND UNIQUE INFORMATION | 16 |
|     event_relation_id | 16 |
|     for(i=0;i<N;i++){ | |
|         reference_node_id | 16 |
|         reference_number | 8 |
|         last_reference_number | 8 |
|     } | |
| } | |

FIG.5C

NODE RELATION DESCRIPTOR

| DATA STRUCTURE | NUMBER OF BITS |
|---|---|
| reference_descriptor(){ | |
|     descriptor_tag | 8 |
|     descriptor_length | 8 |
|     referenct_type | 4 |
|     external_reference_flag | 1 |
|     reserved_future_use | 3 |
|     if(external_reference_flag==1){ | |
|         information_provider_id | 16 |
|         SECOND UNIQUE INFORMATION | 16 |
|         event_relation_id | 16 |
|     } | |
|     reference_node_id | 16 |
|     reference_number | 8 |
| } | |

FIG.8

| LOCAL EVENT INFORMATION | |
|---|---|
| DATA STRUCTURE | NUMBER OF BITS |
| table_id | 8 |
| section_length | 12 |
| event_id | 32 |
| version_number | 5 |
| section_number | 8 |
| last_section_number | 8 |
| service_id | 16 |
| for(i=0;i<N;i++) { | |
|     local_event_id | 16 |
|     descriptors_loop_length | 12 |
|     for(j=0;j<M;J++) { | |
|         descriptor() | |
|     } | |
| } | |

FIG.9

RELATION INFORMATION BETWEEN LOCAL EVENTS

| DATA STRUCTURE | NUMBER OF BITS |
|---|---|
| table_id | 8 |
| section_length | 12 |
| event_relation_id | 32 |
| version_number | 5 |
| section_number | 8 |
| last_section_number | 8 |
| information_provider_id | 16 |
| relation_type | 4 |
| for (i=0; i<N; i++) { | |
|     node_id | 16 |
|     collection_mode | 4 |
|     parent_node_id | 16 |
|     reference_number | 8 |
|     descriptors_loop_length | 12 |
|     for (j=0; j<M; J++) { | |
|         descriptor () | |
|     } | |
| } | |

DIGITAL BROADCASTING SYSTEM AND DIGITAL BROADCASTING STATION AND DIGITAL BROADCASTING RECEIVER

BACKGROUND OF THE INVENTION

1. Field of the Invention

The present invention relates to digital broadcasting system and more particularly to digital broadcasting system including digital broadcasting receiver having recording and reproducing function of digital broadcasting program. In addition, the invention relates to digital broadcasting station and digital broadcasting receiver used for digital broadcasting system.

2. Background Art

In recent years digitization of television broadcasting is promoted in Japan and the beginning of BS digital broadcasting with the use of satellite is scheduled on and after the end of 2000 in Christian era. The digital broadcasting with the use of ground wave is also scheduled to begin on and after the end of 2003 in Christian era. In digital broadcasting, users are offered programs as digital information so that various services are available to users.

For example, in digital broadcasting, information associated with the program is set to be broadcasted whenever necessary from the digital broadcasting station. This program associated information includes program arrangement information. As for the program arrangement information, it is defined in standards "program arrangement information to employ in digital broadcasting" (ARIB STD-B10 Ver. 1.2) published by Corp. ARIB (Association of Radio Industries and Businesses). Program arrangement information includes fundamental information related to the program such as information of the program contents, information needed to make program table and frequency information assigned to the organized channel for broadcasting a program. Consequently, for example, a user can display program table at any time on the screen and select a desired program on the screen for watching.

In addition, the ARIB standard prescribes extended information of program arrangement information (named hereinafter as "program extended information"). This program extended information is an aggregation of plurality of tables such as LIT (Local event Information Table) and prescribes information with regard to local event. LIT is a table describing start time and finish time, etc of a local event. Local event corresponds to each part of a program which in the case is divided by time division like sport news in a news program. LIT is corresponded to one program by event identification expressed by 16 bits (event_id).

Consequently, digital broadcasting receiver of the user side can record only a part of one program (e.g. sport news in a news program) by referring to the program extended information. To be concrete, when a certain local event is indicated recording by a user, digital broadcasting receiver specifies the program based on event identification in the program extended information to extract and record local event in the program.

In addition, there may be a case that the program extended information includes ERT (Event Relation Table). ERT prescribes a relationship among plurality of programs and/or plurality of local events and it is corresponded to event relation identification (event_relation_id) expressed by 16 bits. For example, paying attention to the top news of a news program broadcasted at a fixed time every day, we can find a relevance between local events related to the top news. So, the program extended information prepares ERT to prescribe this relevance.

Consequently, digital broadcasting receiver can record only the top news of a news program which, for example, is broadcasted at a fixed time every day by referring to program extended information. To be concrete, event relation identification described by ERT concerned is also described by LIT. Reading the event relation identification described by LIT, digital broadcasting receiver accesses ERT to identify other local event related to the local event corresponding to LIT concerned. In this case, digital broadcasting receiver specifies LIT based on the event identification to acquire information with regard to the local event. Digital broadcasting receiver records the each local event afterwards based on user's recording indication of serial local events As described above, in the digital broadcasting system, only the event identification is the index to specify a program in case of using the program extended information. However, as the event identification is expressed by 16 bits, conventional digital broadcasting system can merely identify about 65000 programs. Therefore, supposing that the program is changed every 30 minutes for example, a calculation shows that all of a bit pattern for event identification comes to be used up in less than 4 years. In addition, since some program finishes within one minute or five minutes, if event identification is assigned to such programs, all of a bit pattern for event identification may come to be used up in less than a year.

Accordingly, so far as practical use is concerned, same event identification once assigned to a program is recycled to another program after 24 hours passed since closing of the broadcasting program. For example, this practical use is described in BS digital broadcasting operative normal published by ARIB (TR B15 Ver.10).

However, according to the practical use, one event identification shows two or more programs after 24 hours passed since closing of a certain broadcasting program. Therefore, if program extended information is not broadcasted before or after less than 24 hours of a certain broadcasting program, the program can not be specified uniquely in digital broadcasting receiver. In other words, even if program associated information of the program is provided to digital broadcasting receiver after 24 hours passed since closing of a certain broadcasting program from the digital broadcasting station, the program cannot be specified uniquely in the digital broadcasting receiver. Therefore, there remains a problem that transmission flexibility of the program extended information is held in low level.

For example, when having broadcasted a program prescribing the expiry date such as including prize corner or a program including the contents to be corrected, broadcaster sometimes manages to update the program extended information of the program. The reason is because such program as above may probably be recorded in digital broadcasting receiver and so in this case meaningless information is provided to users when they reproduce the recorded program. However, if the program extended information is updated after more than 24 hours passed since broadcasting, program which differs from the event identification included in the program extended information comes to be identified. Therefore, the broadcaster must update program extended information after closing of the broadcasting program within less than 24 hours and so a great time constraint is added.

Incidentally, in order to deal with this, it is conceivable for example the expansion of the number of bits used for the event identification. According to this architecture, because the number of programs capable of being identified by event identification can be boosted, even if event identification is not recycled after 24 hours passed since the closing of broadcasting program, the program comes to be identifiable. Consequently, the digital broadcasting station can transmit the program associated information at any timing.

However, as the event identification is employed not only by the table composing program extended information but also by a great number of tables composing program arrangement information, it is necessary to extensively modify software or the like of the digital broadcasting receiver already designed or shipped. Therefore, it is virtually impossible to expand the number of bits used for event identification.

SUMMARY OF THE INVENTION

The present invention is proposed in order to solve such problems as described above and is directed to the digital broadcasting system capable of reducing time constraints in transmission of program extended information without being accompanied with modification of the broadcasting receiver already designed or shipped.

In addition, it is an advantage of the invention to provide digital broadcasting station and digital broadcasting receiver used for digital broadcasting system such as mentioned above.

The invention to achieve the advantage relates to digital broadcasting system including digital broadcasting station and digital broadcasting receiver. Digital broadcasting station includes a program framing unit for making a digital broadcasting program including local event, an information preparation unit for preparing a program extended information comprising a first table describing detailed information of local event included in the digital broadcasting program and further describing an event identification which is an identification information of the corresponded digital broadcasting program and a first unique information, and a broadcasting transmission part for transmitting digital broadcasting signal multiplexed by digital broadcasting program and program extended information.

In addition, the digital broadcasting receiver comprises a receiving unit for receiving the digital broadcasting signal transmitted from the digital broadcasting station, a recording unit for recording digital broadcasting program included in received digital broadcasting signal, a program identification unit for identifying digital broadcasting program based on the event identification and the first unique information described in the first table of the program extended information included in the received digital broadcasting program, and a processing unit for processing local event included in the digital broadcasting program identified by the program identification unit from among the digital broadcasting programs included in the digital broadcasting signal and the digital broadcasting programs recorded by the recording unit based on detailed information described in the first table.

According to the invention, since the event identification and the first unique information as identification information is described in the first table describing detailed information of local event, digital broadcasting program is identified uniquely for a long term by receiver side. Therefore, the digital broadcasting station can broadcast program extended information at any timing. Consequently, time constraints added to broadcasting of the program extended information broadcasted by the digital broadcasting station can be reduced largely. Besides, since the digital broadcasting program is identified uniquely at receiver side, recording, reproducing and erasing of a program for example local event by local event is realized without being added time constraints. Therefore, it is made possible to plan a great improvement in services to users.

BRIEF DESCRIPTION OF THE DRAWINGS

With reference to the accompanying drawings,

FIG. 2 is a drawing showing the data structure of LIT and ITT;

FIG. 5 is a drawing to show ERT, the data structure of reference descriptor and node relation descriptor related to the third embodiment of the invention;

FIG. 8 is a drawing showing the data structure of a local event information table related to the fourth embodiment;

FIG. 9 is a drawing showing the data structure of a table of relation between events information.

DETAILED DESCRIPTION OF THE PREFERRED EMBODIMENT

Referring to the accompanied drawings, the embodiment of the invention is explained in detail as follows. It is assumed that various kinds of description and data nomenclature employed in following explanation are based on STD-B10 specification published by ARIB.

First Embodiment

Figure 1:
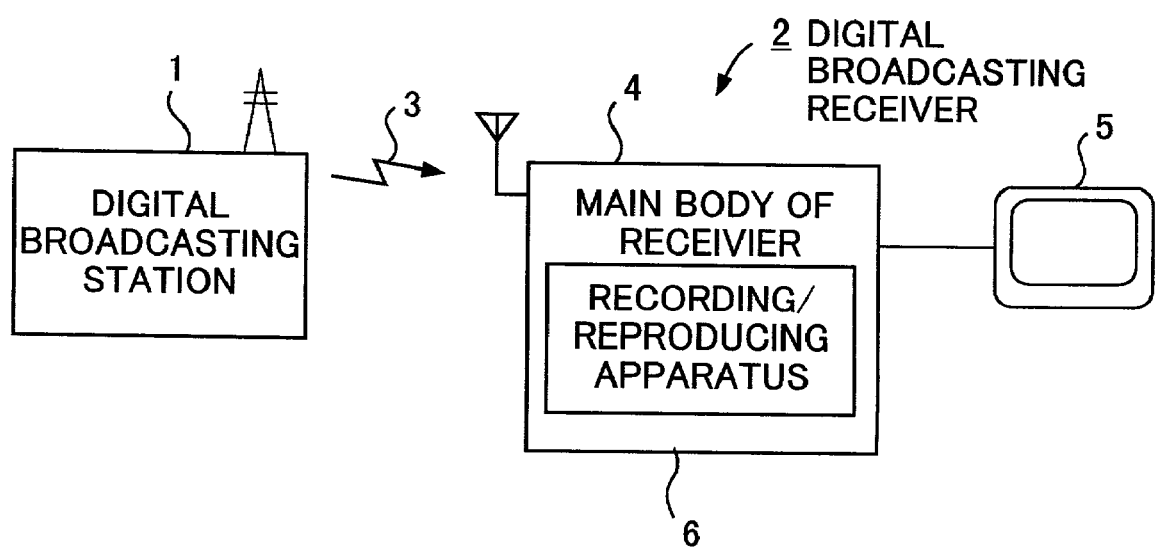
FIG. 1 is a conceptual diagram showing the architecture of digital broadcasting system related to the first embodiment of the invention.

FIG. 1 is the block diagram showing the architecture of digital broadcasting system related to the first embodiment of the invention. This digital broadcasting system presents programs to digital broadcasting receiver 2 that a user possesses from digital broadcasting station 1 or the digital broadcasting transmitter possessed by a broadcaster.

Explaining in more detail, digital broadcasting station 1 is a digital broadcasting transmitter that produces digital broadcasting signal including a program and a program associated information to broadcast them. To be more concrete, digital broadcasting station 1 produces a program according to MPEG 2 (Moving Picture Experts Group 2) system by digital processing. In addition, digital broadcasting station 1 produces program associated information according to MPEG 2 system by digital processing. Digital broadcasting station 1 broadcasts the digital broadcasting signal multiplexed by main part of a program and a program associated information over broadcasting channel 3.

Digital broadcasting receiver 2 receives digital broadcasting signal over broadcasting channel 3. Digital broadcasting receiver 2 has a function of displaying a program included by the digital broadcasting signal in real time or recording, playing or erasing programs by executing predetermined processing to the received digital broadcasting signal. To be more concrete, digital broadcasting receiver 2 comprises main body of receiver 4 and TV monitor 5. Main body of receiver 4 comprises recording/reproducing apparatus 6 capable of recording and reading data.

Digital broadcasting receiver 2 demodulates the received digital broadcasting signal to separate and extract the main part of the program and the program associated information. After that, digital broadcasting receiver 2 processes the program on the basis of the program associated information according to the indication from the user. For example, when indicated by a user to display the program in real time, digital broadcasting receiver 2 extracts the indicated program based on program associated information and displays the program on TV monitor 5. In addition, when indicated by a user to record the program, digital broadcasting receiver 2 determines whether the program is being broadcasted currently based on the program associated information and extracts the indicated program in case of it being currently broadcasted and records them in recording/reproducing apparatus 6.

Furthermore, in case that the indicated program is a program scheduled to be broadcasted in the future, recording of the program is reserved and the program is extracted at the time when the program comes on the air in reality and recorded in recording/reproducing apparatus 6. Furthermore, in case that the user indicated reproducing of a recorded program, digital broadcasting receiver 2 reads the recorded program recorded in recording/reproducing apparatus 6 and displays it on TV monitor 5. Furthermore, in case that the user indicated erasing of a recorded program, digital broadcasting receiver 2 identifies the program recorded in recording/reproducing apparatus 6 and erases it.

Incidentally, the first embodiment illustrates the apparatus in which main body of receiver 4 and TV monitor 5 is separated to each other. However, it is of course preferable that TV monitor built-in the function of receiving broadcasting program or the function of main body of receiver 4 may be used as digital broadcasting receiver.

In this digital broadcasting system, the program associated information includes the information that can specify a program uniquely. In other words, it includes the information that can specify the program for a long term at least more than 24 hours uniquely. To be more concrete, the program associated information includes program arrangement information and program extended information. The program arrangement information comprises contents of the program, time table of the program and the frequency assigned to the organized channel as information. Program extended information is the extended information of program arrangement information and mainly describes the information with regard to the local event. The information specifying the program uniquely is included in this program extended information.

Program extended information includes plurality of tables. To be concrete, event information table includes LIT (Local event Information Table) and ITT (Information Transmission Table). In this first embodiment, the digital broadcasting station 1 describes the information specifying the program uniquely in these LIT and ITT.

FIG. 2 is the drawing showing the data structure of LIT and ITT. To be more concrete, LIT is corresponded to one organized channel by service identification (service_id) and further corresponded to one program of the organized channel by event identification (event_id). Additionally, as shown in FIG. 2A, LIT specifies the local event of the program concerned by describing local event identification (local_event_id).

Furthermore, LIT describes detailed information of local event by reference identifier. For example, detailed information of local event includes start time and finish time of local event and event relation identification (event_relation$_{13}$ id). Event relation identification is described when local event has a certain relation to that of another programs and specifies ERT (Event Relation Table) which describes the relationship between local events in another program. ERT is a table prescribing the relationship between plurality of programs and/or between plurality of local events. Details are explained in the third embodiment.

Furthermore, LIT describes the first unique information as is shown encircled by a rectangle in FIG. 2A. The first unique information is expressed by 16 bits to specify uniquely a program from the event identification (event_id). To be more concrete, the first unique information prescribes broadcast day of the program. In this case, the first unique information describes the date of real broadcasting by 16 bits as broadcast day of the program. To be more concrete, the first unique information is described according to amended Julian calendar. The dates expressible by amended Julian calendar in current digital broadcasting system remains until Christian era Apr. 22, 2038. Therefore, if amended Julian calendar is employed, unique specification of a program is made possible for 38 years much longer than 4 years since the present time in Christian era 2000.

ITT describes information with regard to time entry such as start time and finish time, etc described by LIT. Explaining in more detail, digital broadcasting station 1 uses STC (System Time Clock) as reference clock and broadcasts programs. To be more concrete, digital broadcasting station 1 describes the timing information to be described in LIT by STC. In this case, STC expresses absolute time or difference from base time (e.g. start time of the program). ITT describes the relationship between time entry and STC in such way that the time entry described in LIT is the absolute time.

ITT comprises event identification (event_id) as shown in FIG. 2B and it is corresponded to one program by this event identification. In other words, ITT is corresponded to one LIT by the event identification. In addition, ITT includes aforementioned first unique information as is shown encircled by a rectangle in FIG. 2B. This first unique information is provided to specify a program (in other words, LIT) uniquely in combination with event identification like the first unique information described in LIT. The first unique information of ITT concerned is also expressed by 16 bits and includes day entry of amended Julian calendar.

As thus described, digital broadcasting station 1 related to the first embodiment can specify a program uniquely by combining event identification with the first unique information consisting of broadcast day of the program. Therefore, based on the program extended information including the first unique information, digital broadcasting receiver 2 can identify the program concerned after more than 24 hours passed since closing of the broadcasting program. Therefore, digital broadcasting station 1 does not have to broadcast the program extended information before or after 24 hours passing since the program broadcast time and it can broadcast program extended information at any timing for the convenience of the local station. As a result, great flexibility can be secured for transmission of the program extended information.

Figure 3:
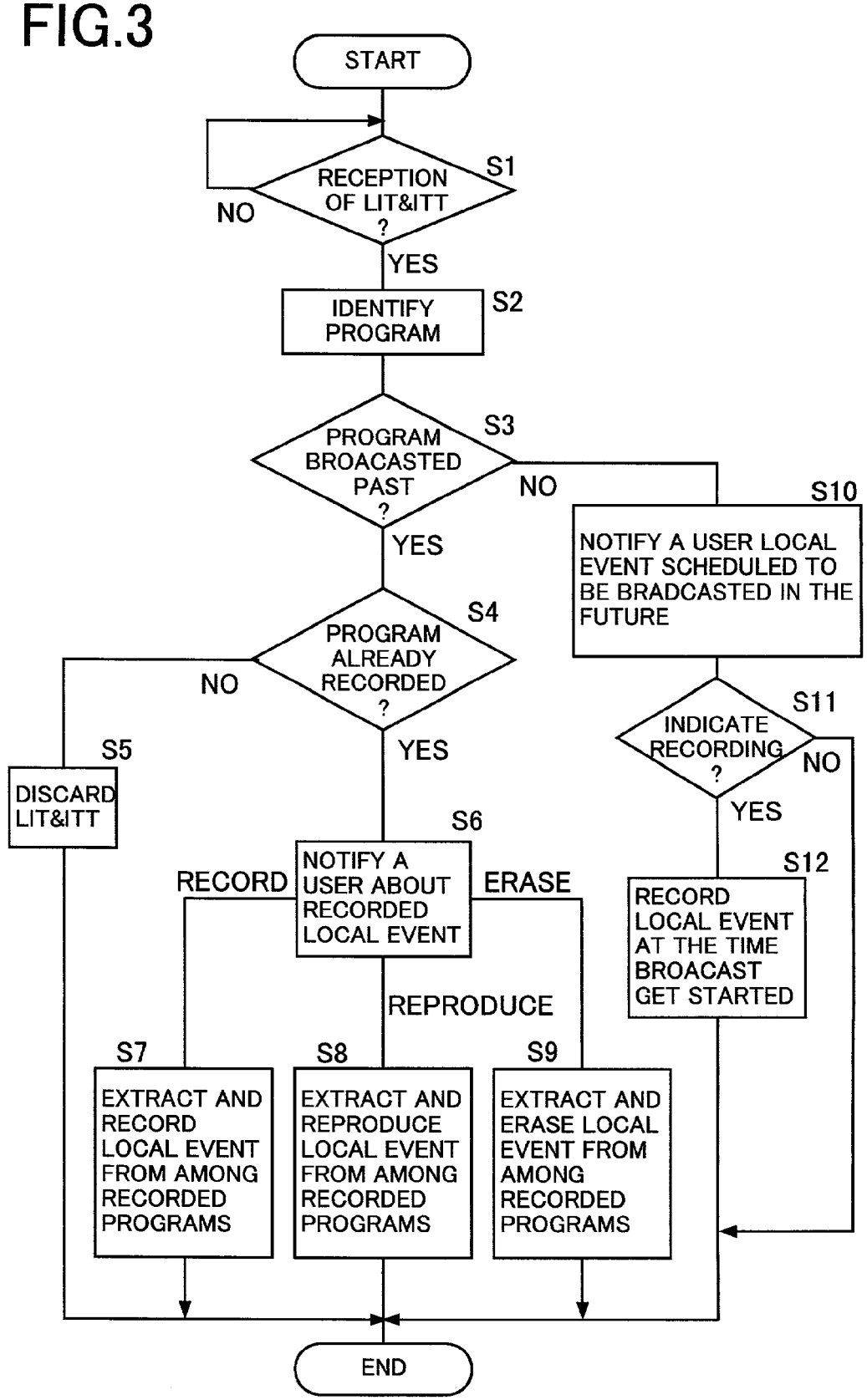
FIG. 3 is a flowchart to explain the action of digital broadcasting receiver related to the first embodiment.

FIG. 3 is the flow chart to explain the action of digital broadcasting receiver 2. Since program extended information is transmitted at any timing, digital broadcasting receiver 2 always watches reception of LIT and ITT (step S1). When LIT and ITT are received, digital broadcasting receiver 2 processes local event of the digital broadcasting program based on LIT and ITT.

Explaining in more detail, referring to the version number of the program extended information, digital broadcasting receiver 2 determines whether the program extended information corresponding to the same program has arrived already. The reason why the same program extended information is transmitted may be due to the case in which error or modification is included in the program extended information transmitted before. If it has arrived already, digital broadcasting receiver 2 cancels the program extended information having arrived already and persecutes the processing of the local event based on the contents described in the program extended information newly arrived.

To be more concrete, digital broadcasting receiver 2 identifies the digital broadcasting program based on the event identification and the first unique information described in LIT and ITT (step S2). In this case, the digital broadcasting program can be identified uniquely by the event identification and the first unique information. In addition, digital broadcasting receiver 2 determines the program corresponded to said LIT and ITT whether it is a broadcasted program or a program scheduled to be broadcasted in the future based on the event identification and the first unique information (step S3).

If it is a program broadcasted in the past, digital broadcasting receiver 2 determines whether the program is recorded in recording/reproducing apparatus 6 (step S4). If the program is not recorded, digital broadcasting receiver 2 cancels the program associated information (step S5). On the other hand, if the program is recorded, digital broadcasting receiver 2 informs the user of processing the local event (step S6).

To be more concrete, digital broadcasting receiver 2 displays a picture image on TV monitor 5 which enables a selection of either one of the each local event based on the detailed information of the local event described in LIT and ITT. TV monitor 5 also displays picture image on TV monitor 5 which enables a selection how to operate the data of local event selected. For example, digital broadcasting receiver 2 displays on TV monitor 5 the selection picture image of operation such as cutting out only the local event to record them again or reproducing the local event or erasing the local event.

For example, when the user selects sport news and directs re-record operation, digital broadcasting receiver 2 acquires information such as start time and finish time of the selected sport news based on LIT and ITT of the program extended information received. After that, digital broadcasting receiver 2 extracts the part corresponding to the acquired start time and finish time from among the recorded programs and records it independently regarding it as one program (step S7). As thus described since the program can be specified uniquely at any time, it is made possible to record the whole program for the time being and edit them deliberately afterwards.

In addition, if sport news is selected by a user and reproducing operation is ordered, digital broadcasting receiver 2 acquires start time and finish time of the selected sport news based on LIT and ITT of the received program extended information mentioned as above. After that, digital broadcasting receiver 2 extracts the part corresponding to the acquired start time and finish time from among the recorded programs and displays the extracted part on TV monitor 5 (step S8). As thus described because a program can be specified uniquely at any time, it is made possible to record the whole program for the time being and watch the desired part deliberately afterwards.

Furthermore, if sport news is selected by a user and erasing operation is ordered, digital broadcasting receiver 2 acquires start time and finish time of said selected sport news based on LIT and ITT of the received program extended information mentioned as above. After that, digital broadcasting receiver 2 extracts the part corresponding to the acquired start time and finish time from among the recorded programs and erase the extracted part (step S9). As thus described because the program can be specified uniquely at any time, it is made possible to edit them deliberately afterwards.

On the other hand, if transmitted program extended information is related to a program scheduled to be broadcasted in the future by digital broadcasting station 1, digital broadcasting receiver 2 informs user of the local event recordable in the future (step S10). To be more concrete, digital broadcasting receiver 2 displays selection picture image of the local event included in the program scheduled to be broadcasted such as sport news or weather forecast. Digital broadcasting receiver 2 also displays picture image on TV monitor 5 asking the user whether these local events is made reservation for recording.

If reservation for recording is not ordered (NO in step S11), digital broadcasting receiver 2 cancels LIT and ITT as it is and no operation related to the local event is persecuted in particular. On the other hand, if for example user selected sport news and ordered reserved recording operation (YES in step S11), digital broadcasting receiver 2 acquires information such as start time and finish time of the selected sport news based on LIT and ITT. After that, digital broadcasting receiver 2 records the local event at the beginning of broadcast of the local event (step S12). As thus described because a program can be specified uniquely at any time, a program ahead of more than 24 hours can be reserved for recording.

According to the first embodiment as mentioned above, program extended information is included with the information that identifies a program for a long term at least greater or equal to 24 hours and digital broadcasting receiver 2 can surely specify the program referring to the program extended information. Consequently, digital broadcasting station 1 can transmit program extended information at any timing. Therefore, time constraints added to the transmission of program extended information can be reduced significantly.

In addition, at the present time (autumn Christian era 2000), digital broadcasting station transmitting program extended information and digital broadcasting receiver recording the program with the aid of program extended information are not yet put to practical use. Therefore, it is quite easy to add the first unique information to the program extended information and there is no need to change architecture of the digital broadcasting receiver for the purpose of having the function for identifying a program based on the event identification and the first unique information.

Further, since digital broadcasting program can be identified uniquely for a long term, operations such as recording, reproducing or erasing a local event by local event are made possible without being added time constraints. Therefore, it is made possible to plan a great improvement in services to users.

Furthermore, the date of amended Julian calendar used as the first unique information is also used in digital broadcasting station and digital broadcasting receiver already designed and produced. Therefore, the digital broadcasting station does not have to modify control software of the digital broadcasting receiver extensively. Therefore, the aforementioned services can be realized at low cost.

Incidentally, in the description mentioned as above, broadcast day of a program is adopted as the first unique information. However, for instance unique number identification given to all programs broadcasted in all organized channel may be adopted as the first unique information. Explaining in more detail, establishing for instance management entity that all the broadcaster in Japan join, all the program are assigned unique number identification by the management entity. This assigned number identification is dealt as the first unique information. According to this architecture, since all the programs can be identified by one number identification, every program can be specified uniquely in digital broadcasting receiver.

In addition, pseudorandom number for example may be adopted as the first unique information. To be more concrete, the digital broadcasting station generates pseudorandom number having a fixed length while making program extended information. As for the generation method of pseudorandom number, for example, an approach same as pseudo unique identification number given to each electronic mail statement in general electronic mail can be applied. The digital broadcasting station incorporates generated pseudorandom number into the program extended information as a first unique information. As thus described, when applying pseudorandom number as the first unique information, all that needed is simply a matter of providing architecture that generates pseudorandom number. Therefore, a merit that system can be built at low cost may be available in comparison with the case of establishing management entity.

Furthermore, in the description as above, the first unique information has 16 bits. In other words, a digital broadcasting program can be identified by precision degree of 65000 times in comparison with prior art. However, number of bits greater than 16 bits may be assigned to the first unique information for improving the accuracy. In addition, if amount of data cut is regarded as important despite the precision is dropped to some extent, small bit numbers of less than 16 bits may be assigned to the first unique information.

Furthermore, it is assumed that a program can be identified uniquely by expanding entry description of LIT and ITT. However, in order not to obstruct conventional operation, LIT and ITT describing the first unique information may be adopted as the expandable table identification not yet used in ARIB standard.

In current ARIB standard, table identification named 0xD0 and 0xD2 are assigned to LIT and ITT respectively. On the other hand, in current ARIB standard, there is an expandable table identification not yet used. To be concrete, the expandable table identification not yet used is 0xD8 and 0xDA. Therefore, LIT and ITT describing unique information are assigned 0xD8 and 0xDA respectively. Thus a good operation may be realized without causing any harm in simultaneous operation of digital broadcasting station and digital broadcasting receiver already employed.

Second Embodiment

Figure 4:
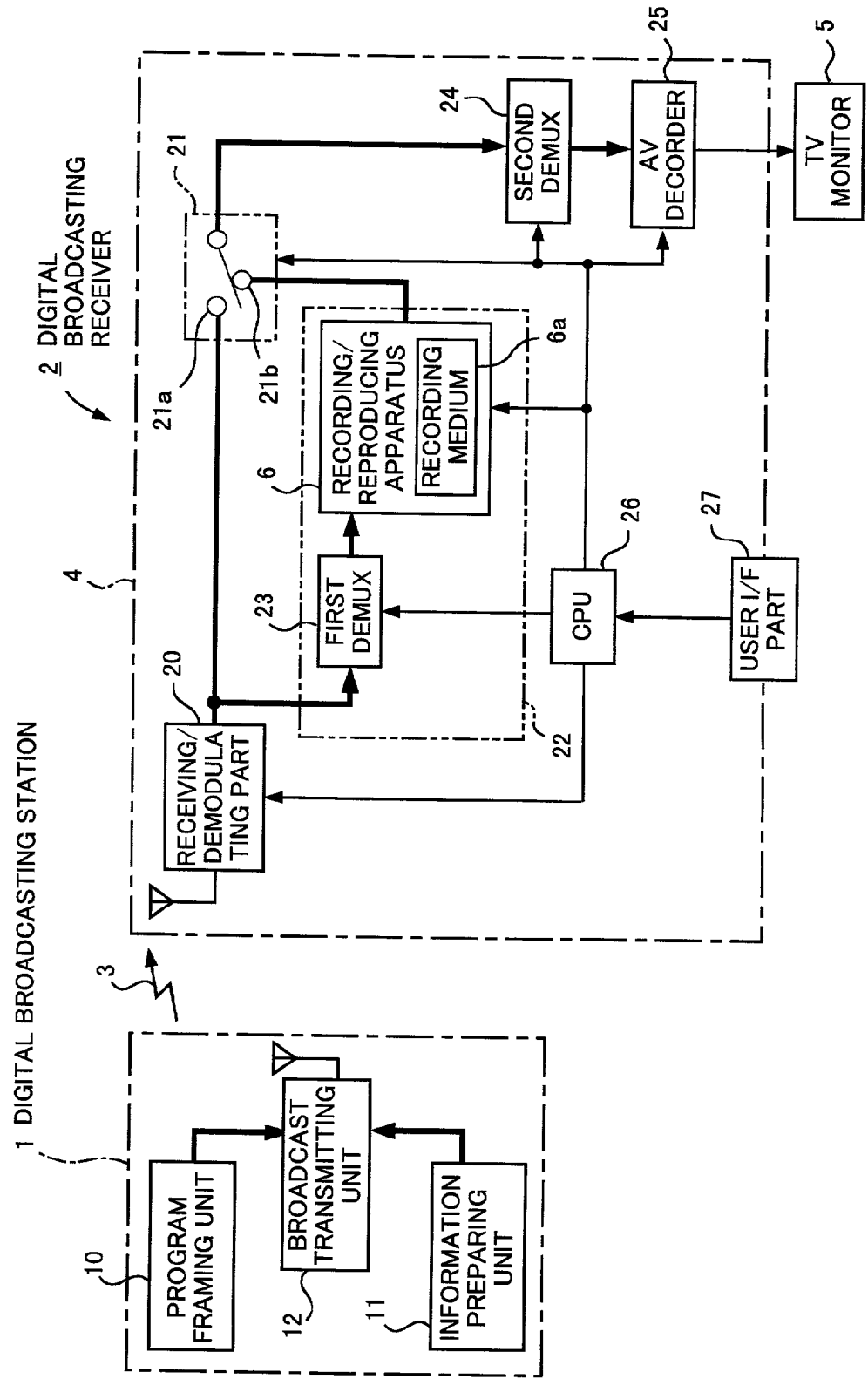
FIG. 4 is a block diagram showing the architecture of digital broadcasting system related to the second embodiment of the invention.

FIG. 4 is the block diagram showing the internal configuration of digital broadcasting station 1 and digital broadcasting receiver 2. The second embodiment is put forth to explain the first embodiment in more detail. In FIG. 4, thick line shows the transmission path of digital information and normal line shows the transmission path of analog control information.

As described above, digital broadcasting system includes digital broadcasting station 1 and digital broadcasting receiver 2. Digital broadcasting station 1 includes program framing unit 10, information preparation unit 11 and broadcast transmission unit 12. Program framing unit 10 makes for example a TV program as digital information. In this case program framing unit 10 makes digital information corresponding to TV program according to MPEG 2 system. To be more concrete, program framing unit 10 divides data such as moving image data or audio data of a program into packets and assigns predetermined PID (Program InDex) to each packet. After that, program framing unit 10 gives the framed digital information to broadcast transmission unit 12 as program packet.

Information preparation unit 11 makes program associated information. To be more concrete, information preparation unit 11 makes program arrangement information and program extended information by digital processing. In this case, information preparation unit 11 prepares LIT and ITT including the first unique information as program extended information. Information preparation unit 11 divides prepared program arrangement information and program extended information into plural packets and assigns unique PID for each packet. Information preparation unit 11 gives the packet to broadcast transmission unit 12 afterwards.

Explaining in more detail, information preparation unit 11 makes tables such as PSI (Program Specific Information) or EIT (Event Information Table) as program arrangement information. PSI is made to realize simple and easy channel selection and program selection in digital broadcasting receiver 2 and comprised of plurality of tables such as PMT (Program Mapping Table). EIT describes detailed information of each program such as information needed for making program table. In addition, information preparation unit 11 makes table of LIT and ITT as program extended information. Information preparation unit 11 divides these tables into packets and gives them to broadcast transmission unit 12.

Broadcast transmission unit 12 makes digital broadcasting signal including main part of program given by program framing unit 10 and program arrangement information and program extended information given by information preparation unit 11. To be more concrete, broadcast transmission unit 12 makes packet stream by time division multiplexing packet composing main part of program and packet composing program arrangement information and program extended information. Then broadcast transmission part 12 modulates a carrier of predetermined frequency based on the packet stream and makes digital broadcasting signal as a modulated signal. Broadcast transmission part 12 broadcasts the digital broadcasting signal.

Digital broadcasting receiver 2 comprises main body of receiver 4 and TV monitor 5. Main body of receiver 4 receives and processes broadcasted digital broadcasting signal from digital broadcasting station 1 and provides the program to TV monitor 5. TV monitor 5 displays the provided program.

Main body of receiver 4 comprises reception demodulation part 20. The output of reception demodulation part 20 is connected to one input 21a of change-over switch part 21. The output of recording/reproducing system 22 is connected to the other input 21b of change-over switch part 21.

Recording/reproducing system 22 has first demultiplexer (FIRST DEMUX) 23 and recording/reproducing apparatus 6. The output of reception demodulation part 20 is connected to the input of first demultiplexer 23 in addition to change-over switch part 21. The output of first demultiplexer 23 is connected to the input of recording/reproducing apparatus 6 and the output of recording/reproducing apparatus 6 is connected to the other input 21*b* of change-over switch part 21. As thus described, change-over switch part 21 selects either of the output of reception demodulation part 20 or the output of recording/reproducing apparatus 6.

The output of change-over switch part 21 is connected to second demultiplexer (SECOND DEMUX) 24 and second demultiplexer 24 is connected to AV decoder 25. AV decoder 25 is connected to TV monitor 5. As described above, the output of reception demodulation part 20 or recording/reproducing apparatus 6 is provided to TV monitor 5 by switching change-over switch part 21.

Main body of receiver 4 is also equipped with CPU 26 as control nucleus. CPU 26 is connected to reception demodulation part 20, first demultiplexer 23, recording/reproducing apparatus 6, second demultiplexer 24 and AV decoder 25. CPU 26 controls the action of reception demodulation part 20 etc. connected thereto. CPU 26 is also connected to user I/F part 27. User I/F part 27 is for example a touch panel and provides indication information to CPU 26 when user operates cursor.

Digital broadcasting receiver 2 is explained in more detail. Reception demodulation part 20 demodulates received digital broadcasting signal and re-constructs packet stream. In this packet stream, packet related to moving image data and audio data of the main part of program and packet related to program associated information such as EIT, LIT and ITT are included as mentioned above. Reception demodulation part 20 gives the packet stream to change-over switch part 21 and first demultiplexer 23.

Change-over switch part 21 passes for example packet stream output by reception demodulation part 20 as it is. This passed packet stream is given to second demultiplexer 24. Second demultiplexer 24 re-constructs and accumulates main part of program and program associated information from above-mentioned packet stream. In addition, second demultiplexer 24 supplies required packet to AV decoder 25 according to the control of CPU 26. AV decoder 25 decodes each supplied packet and makes AV analog signal which meets the information of each packet. AV decoder 25 supplies AV analog signal to TV monitor 5. As a result, a program and program associated information can be displayed on TV monitor 5.

Packet stream output by reception demodulation part 20 is given to first demultiplexer 23 that is a part of recording/reproducing system 22. First demultiplexer 23 re-constructs and holds main part of program and program associated information. To be more concrete, first demultiplexer 23 separates and extracts packet based on PID assigned to each packet and reconstructs main part of program including moving image and voice and reconstructs tables such as PSI, PMT, EIT or ITT. In addition, first demultiplexer 23 gives required packet to recording/reproducing apparatus 6 according to the control of CPU 26.

Recording/reproducing apparatus 6 includes recording medium 6*a*. Recording medium 6*a* is tape medium such as disk drive like hard disk, semiconductor memory, analog video tape and digital video tape. Recording/reproducing apparatus 6 records main part of program in predetermined recording area of recording medium 6*a*. In this case, recording/reproducing apparatus 6 records program associated information corresponding to the program by associating them to main part of program. In addition, recording/reproducing apparatus 6 reads recorded main part of program and supplies them to change-over switch part 21 in accordance with the control of CPU 26. When reproducing a recorded program, change-over switch part 21 selects the input of recording/reproducing apparatus 6 and supplies them to second demultiplexer 24. As a result, AV analog signal corresponding to the recorded program is supplied to TV monitor 5 and recorded program is displayed on TV monitor 5.

[Displaying a Program in Real Time]

Action of digital broadcasting receiver 2 when a program is displayed in real time is as follows. As described above, main body of receiver 4 makes program table based on EIT and displays the program table on TV monitor 5. A user refers to the program table and selects the program for watching. In this case, user selects the program for instance by operating cursor on the screen and ordering determination. Program selection information is given to CPU 26 over user I/F part 27.

Receiving the selection information, CPU 26 refers to the program arrangement information held by first demultiplexer 23 and acquires PID corresponding to the selected program. CPU 26 gives the acquired PID to second demultiplexer 23. Second demultiplexer 24 extracts only PID corresponding to the selected program from plurality of packets provided by change-over switch part 21. After that, second demultiplexer 24 processes extracted program packets and gives them to AV decoder 25. Thus, the selected program is displayed on TV monitor 5.

[Recording a Program]

Action of digital broadcasting receiver 2 when a program is recorded is as follows. A user refers to program table displayed on TV monitor 5 and indicates the program to be recorded for instance by operating cursor. Upon receipt of selection indication, CPU 26 refers to EIT accumulated by first demultiplexer 23 and identifies the program selected by the user.

In EIT, program number (program_number) and running status (running_status) are described. Program number is the identification information of the program. Running status is the information to show broadcast condition of the program whether it is being broadcasted currently.

Referring to the program number of EIT, CPU 26 identifies the program selected by the user. Then, CPU 26 determines whether the selected program is being currently broadcasted based on running status of the specified program. If it is being broadcasted currently, CPU 26 indicates PID related to the program to first demultiplexer 23. In other words, CPU 26 acquires PID of moving image data packet and PID of audio data packet composing the corresponded program and PID of program associated information packet associated with the program and indicates these PID to first demultiplexer 23. In this case, CPU 26 is laid down not to indicate PID of the packet (null packet etc.) which is determined recording is unnecessary.

In addition, if it is a program to be broadcasted in the future, CPU 26 indicates above-mentioned PID to first demultiplexer 23 at the time when the broacasting of the program gets started. Incidentally, CPU 26 refers to EIT concerned which describes only two programs broadcasted several seconds or several minutes ahead of broadcast starting schedule time and begins recording action after having identified that indicated program is going to be broadcasted according to the schedule.

First demultiplexer 23 gives only the packet corresponding to indicated PID to recording/reproducing apparatus 6. To be more concrete, first demultiplexer 23 gives moving image data packet, voice data packet and program associated information packet of the indicated program to recording/reproducing apparatus 6.

Recording/reproducing apparatus 6 records the packet given from first demultiplexer 23 in predetermined recording area. To be more concrete, recording/reproducing apparatus 6 records moving image data packet and audio data packet in predetermined recording area of recording medium 6a. In this case, program associated information packet of the program is recorded in association with moving image data.

In addition, recording/reproducing apparatus 6 sets index area in recording medium 6a beforehand. Recording/reproducing apparatus 6 records index information with regard to the position where the program packet is recorded. With this architecture, CPU 26 can specify record position of the desired program quickly and surely by referring to the index information recorded in the index area.

Index area can be set in the following location. In case that recording medium 6a is a disk drive or a semiconductor memory, index area can be set in any location except continuous recording area that the main part of program is recorded. In addition, in case that recording medium 6a is tape medium, index area can be set in any location except continuous recording area that the main part of program is recorded such as leading part of the tape. Particularly in case of digital video tape, index area can be set in electric storage device contained in tape housing.

Furthermore, in case that recording medium 6a is tape medium and index information is the data easily distinguishable with the main part of program, the index information can be recorded between the data of the main part of program. Thus, the random access nature of the tape can be raised.

In addition, the serial recording operation of the program mentioned as above can be executed without the aid of signal wire tying reception demodulation part 20, change-over switch part 21 and second demultiplexer 24. Therefore, user can record desired programs while watching another program aside from the program being recorded. However, it is necessary for reception demodulation part 20 to comprise a function of receiving plurality of channels and a function of distributing the program related to plurality of channels to the side of first and second demultiplexer 23, 24 in order to process plurality of programs via different channels.

[Reproducing or Erasing the Recorded Program]

Action of digital broadcasting receiver 2 when reproducing or erasing the recorded program is as follows. When reproducing or erasing a recorded program, user can display for example the whole list of recorded program on the screen. To be more concrete, when the whole list of the recorded program is indicated by a user, CPU 26 accesses recording/reproducing apparatus 6 and indicates to output the index information recorded in the index area of recording medium 6a. Recording/reproducing apparatus 6 outputs the index information to change-over switch part 21 in accordance with the indication. Thus, the list of the recorded program can be displayed on the screen.

Indicating reproducing or erasing by operating the cursor on the list, a user can reproduce or erase the recorded program concerned. To be more concrete, CPU 26 accesses index area of recording/reproducing apparatus 6 and indicates initiating output of the indicated main part of program. In addition, CPU 26 switches change-over switch part 21 to recording/reproducing apparatus 6 side. As a result, the main part of program is transmitted over change-over switch part 21 to second demultiplexer 24 and AV decoder 25. CPU 26 controls second demultiplexer 24 and AV decoder 25 and displays the recorded program on TV monitor 5. In another case, CPU 26 accesses the index area of recording/reproducing apparatus 6 and indicates erasing of the indicated main part of program. In response to this indication, recording/reproducing apparatus 6 erases the indicated main part of program.

[Recording/Reproducing/Erasing of the Local Event]

Operation to the local event is persecuted as follows. The program extended information which describes detailed information of the local event is broadcasted by digital broadcasting station 1 at any timing as mentioned above. Therefore, first demultiplexer 23 watches reception of LIT and ITT. When having received LIT and ITT, first demultiplexer 23 notifies of LIT and ITT having arrived by outputting interruption requirement to CPU 26. In addition, first demultiplexer 23 accumulates LIT and ITT concerned.

CPU 26 specifies broadcast timings of the program corresponding to the arrived LIT and ITT based on EIT, LIT and ITT in response to the notice mentioned as above. In this case, CPU 26 identifies the program based on the event identification and the first unique information described by above-mentioned LIT and ITT and identifies the broadcast timings of the program by referring to EIT corresponding to the program.

If it is a program broadcasted in the past, CPU 26 determines whether the program is recorded in recording/reproducing apparatus 6. To be more concrete, CPU 26 accesses recording/reproducing apparatus 6 and acquires index information recorded in the index area of recording medium 6a. Then, CPU 26 determines whether the program is recorded by comparing event identification and the first unique information described by above-mentioned LIT and ITT with the index information.

When the program is not recorded, CPU 26 holds or cancels LIT and ITT. On the other hand, if the program is recorded, CPU 26 informs user that the program extended information of the recorded program has arrived. To be more concrete, CPU 26 controls second demultiplexer 24 and AV decoder 25 based on detailed information of the local event described in LIT and ITT and displays picture image as graphic image for selecting one of the each local events on TV monitor 5. In this case, CPU 26 makes it selectable how to process the local event in the selected program. For example, CPU 26 displays selection image picture of recording, reproducing and erasing of the local event on TV monitor 5.

For example, when sport news is selected by a user and re-recording operation is ordered, CPU 26 acquires the information of start time and finish time of the selected sport news as mentioned above based on LIT and ITT accumulated in first demultiplexer 23. After that, CPU 26 re-records in recording/reproducing apparatus 6 the local event corresponding to the acquired start time and finish time from among the recorded programs recorded in recording/reproducing apparatus 6.

To be more concrete, CPU 26 accesses the index area of recording/reproducing apparatus 6 and specifies the recorded program. After that, CPU 26 regards the local event corresponding to the acquired start time and finish time as one program among the specified programs and indicates to record it in another recording area to recording/reproducing apparatus 6. In response to this indication, recording/reproducing apparatus 6 records the local event in another recording area and records position information related to the local event in the index area. Thus, CPU 26 can access only the local event by referring to the index area.

In addition, when sport news is selected by a user and reproducing operation is indicated, CPU 26 acquires start time and finish time of the selected sport news based on LIT and ITT accumulated by first demultiplexer 23. After that, CPU 26 reproduces the local event corresponding to the acquired start time and finish time from among the programs recorded in recording/reproducing apparatus 6.

Explaining in more detail, CPU 26 accesses the index area in the recording/reproducing apparatus for local event and specifies the recorded program. After that, CPU 26 indicates recording/reproducing apparatus 6 to output the local event corresponding to the acquired start time and finish time from among the specified programs. In addition, CPU 26 controls change-over switch part 21 to select the output of recording/reproducing system 22. Furthermore, CPU 26 controls second demultiplexer 24 and AV decoder 25 and indicates to display the local event having been input.

As a result, recording/reproducing apparatus 6 outputs the local event. The local event is given to second demultiplexer 24 through change-over switch part 21 and displayed on TV monitor 5 via AV decoder 25.

Furthermore, when sport news is selected by a user and erasing operation is indicated, CPU 26 acquires start time and finish time of the selected sport news based on LIT and ITT accumulated by first demultiplexer 23. After that, CPU 26 erases the local event corresponding to the acquired start time and finish time from among of the recorded programs.

To be more concrete, CPU 26 accesses the index area of recording/reproducing apparatus 6 and specifies the recorded program. After that, CPU 26 indicates to erase the local event corresponding to the acquired start time and finish time from among the specified programs to recording/reproducing apparatus 6. In response to this indication, recording/reproducing apparatus 6 erases the local event.

On the other hand, if transmitted LIT and ITT is related to the program scheduled to be broadcasted in the future, CPU 26 notifies a user of the local event recordable in the future. To be more concrete, CPU 26 controls second demultiplexer 24 and AV decoder 25 based on detailed information of the local event described in LIT and ITT and displays picture image to select one of the each local events as graphic image on TV monitor 5. In this case, CPU 26 makes it possible to indicate reserved recording of the selected local event.

For instance, when sport news is selected and reserved recording operation is indicated by a user, CPU 26 acquires information such as start time and finish time of the selected sport news from LIT and ITT accumulated by first demultiplexer 23. After that, CPU 26 keeps waiting till the start time coming.

When the start time comes, CPU 26 acquires PID of the packet corresponding to the sport news by referring to PMT accumulated by first demultiplexer 23 and indicates PID concerned to first demultiplexer 23 to pass the packet related to PID concerned. First demultiplexer 23 passes the packet related to PID to give it to recording/reproducing apparatus 6. Recording/reproducing apparatus 6 records the given packet in predetermined area in the recording medium 6a and records the index information such as recording position in the index area.

As described above, according to the second embodiment, digital broadcasting receiver can identify a digital broadcasting program uniquely same as the first embodiment by describing the event identification and the first unique information in LIT and ITT. Therefore, time constraints added to digital broadcasting station 1 for transmitting the program extended information can be reduced significantly.

Incidentally, in the above description, erasing of the recorded program is done by receiving the indication from a user. However, the recorded program may be erased by automatic judgement of CPU 26. For example, information about user's taste may be registered at the time initiating system action. Consequently, when having received LIT and ITT and in case that the local event unexpected in the registered taste information (e.g. contents for adults) is recorded, CPU 26 erases the local event automatically. According to this architecture, it is made possible to plan the improvement in the services to users.

In addition, in the description above, when a user indicated erasing of the recorded local event, the local event concerned is erased really. However, in case of erasing is ordered, supposing the local event invalid, reproducing of the local event may be prohibited until the invalidity is decoupled. According to this architecture, reproducing of the local event is prohibited for the time being so that erasing is permitted in reality only after the record capacity becomes insufficient. Therefore, high security is obtained and the record capacity can be made effective use. Incidentally, in this case, invalidity unit may be a unit peculiar to recording medium 6a such as unit by program or a cluster in hard disk other than the unit by the local event as described above.

Furthermore, in the description as above, when a user indicates re-recording of the local event, the program including the local event comes to be preserved just as recorded. However, CPU 26 may erase the local event automatically except the local event including the indicated local event. According to this architecture, a user can make effective use of the capacity of recording medium 6a by preserving only the local event in which the user developed an interest.

Furthermore, in the description as above, it is based on the premise that encryption of the digital broadcasting signal is not executed. However, it is of course permissible to make encryption on digital broadcasting signal. In this case, the encryption may be dealt with by establishing decryption mechanism in reception demodulation part 20 in case that a contract has been concluded between broadcasters and users already at the time receiving the broadcast and that the signal processing is performed in the condition of the encryption being deciphered. In addition, in case that a contract has not been concluded yet at the time receiving the broadcast reception or recording the local event and that the contract is concluded at the time reproducing the local event already recorded, the encryption may be dealt with by establishing decryption mechanism in recording/reproducing apparatus 6.

Third Embodiment

FIG. 5 is the drawing to show data structure of ERT, reference descriptor and node relation descriptor which is a part of the table composing program extended information related to the third embodiment of the invention.

In aforementioned first and second embodiments, first unique information that makes one program being identified uniquely for a long term is described in the program extended information. However, though the program itself may be identified uniquely, relationship between plurality of programs and/or relationship between plurality of local events (named hereinafter merely "relationship between programs") can not be identified uniquely with the aid of only the first unique information. Thus, in the third embodiment, information that makes the relationship between programs being identified uniquely for a long term comes to be described in the program extended information in addition to the first unique information of LIT and ITT.

Explaining in more detail, it is a table named ERT (Event_Relation_Table) that describes the relationship between programs. In the third embodiment, information to identify the relationship between programs uniquely is added to this ERT. Explaining ERT, it is one of the program extended information. ERT is corresponded to one event relation identification (event_relation_id) and describes the relationship between programs as node tree. Suppose there are plurality of local event having for example a relationship of everyday top news. In this case, different news are in relationship of equivalence and for instance news conveying overviews and news conveying details may be said to be in relationship of parent and child. ERT describes node tree based on this relationship regarding the local event as a node.

According to ARIB standard, the information employed to identify ERT is the event relation identification as mentioned above. This event relation identification is expressed by 16 bits same as the event identification such as LIT according to ARIB standard. Therefore, event relation identification is reusable every transit of 24 hours in BS digital broadcasting operation normal of ARIB same as the event identification. Therefore, in this third embodiment, ERT is added second unique information that can identify ERT uniquely in addition to the event relation identification as shown in FIG. 5A. In other words, the second unique information that can identify ERT uniquely so long as at least 24 hours after the broadcast is added to ERT in this third embodiment.

The second unique information is expressed for example by the broadcast day that ERT concerned is broadcasted (updating day), the unique identification information or the pseudorandom number same as the first embodiment. In other words, in this third embodiment ERT comes to be identified uniquely by combining the event relation identification with the second unique information.

In addition, in this third embodiment, the second unique information is added not only to ERT but also to the reference descriptor as shown in FIG. 5B. Explaining in more detail, the reference descriptor is used for the purpose of relating ERT to the program and/or the local event and it is related to both of ERT and LIT. As mentioned above, node tree is described in ERT. Each node expresses a program or a local event and it is necessary to specify in which LIT is described these local event etc. Reference descriptor describes this correspondence.

Furthermore, in this third embodiment, the second unique information is also added to the node relation descriptor as shown in FIG. 5C. This node relation descriptor is also related to both of ERT and LIT.

Figure 6:
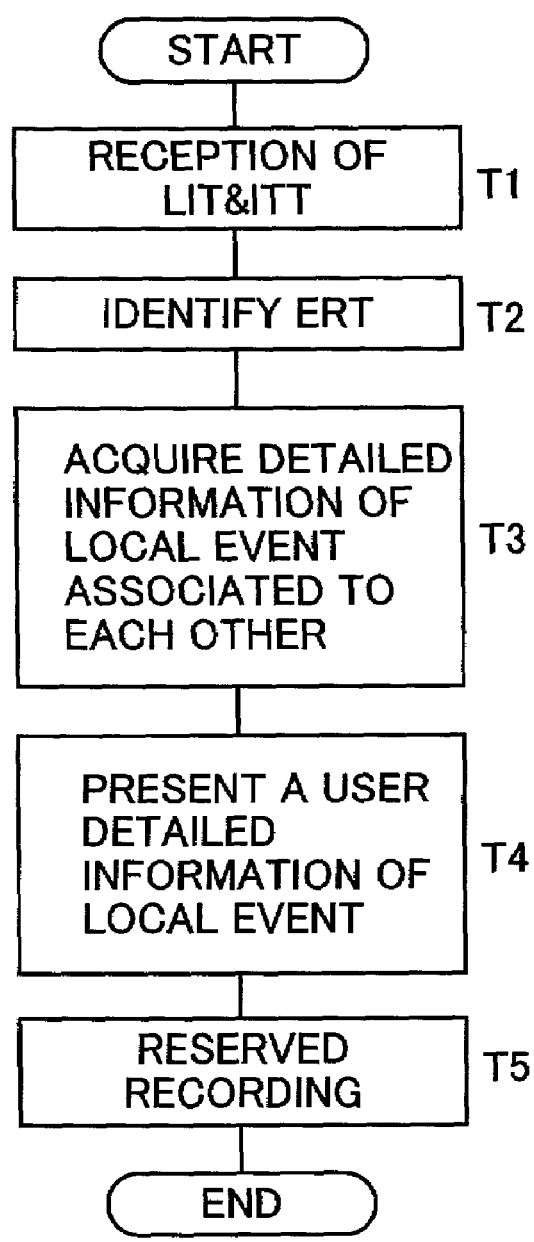
FIG. 6 is a flowchart to explain the action of digital broadcasting receiver related to the third embodiment.

FIG. 6 is the flowchart showing the action of digital broadcasting receiver 2 when ERT is received. This flowchart shows the case of receiving ERT concerned along with LIT and ITT. When first demultiplexer 23 receives LIT and ITT, first demultiplexer 23 accumulates these LIT and ITT and notifies CPU 26 of the effect that it received them. Upon receipt of receiving notice of LIT and ITT (step T1), CPU 26 accesses LIT and ITT accumulated in first demultiplexer 23 and acquires the detailed information of the local event from these LIT and ITT.

After that, CPU 26 determines whether there is ERT. As mentioned above, reference descriptor describing the event relation identification is related to LIT. Therefore, CPU 26 can determine whether there is ERT by referring to the reference descriptor.

CPU 26 identifies unique ERT based on the event identification and the second unique information in the reference descriptor (step T2). Then, CPU 26 accesses first demultiplexer 23 and acquires ERT accumulated by first demultiplexer 23 and acquires the relationship between programs. To be more concrete, the relationship of the local event is described in ERT as mentioned above. Therefore, CPU 26 can get the knowledge of the local event having a relationship to the local event described in LIT concerned by referring to ERT. In this case, it is necessary for CPU 26 to specify LIT and ITT describing detailed information of the local event associated to each other. On the other hand, since the first unique information is described in addition to the event identification in LIT and ITT as mentioned above, the local event is identified uniquely by the relationship between programs described in ERT concerned (step T3).

When CPU 26 acquires detailed information of the local event related mutually in this way, detailed information of these plurality of local event is provided to the user (step T4). For example, when the plurality of local events defined to have a relationship by ERT is scheduled to be broacasted in the future, CPU 26 displays them on TV monitor 5 as the local event having mutual relationship and scheduled to be broacasted in the future. When reserved recording of all the events in a program is indicated by user's operation of cursor, CPU 26 makes recording/reproducing apparatus 6 record the local event when the local event indicated reserved recording is broacasted (step T5).

Action of digital broadcasting receiver 2 is described as follows in case of changing the contents of ERT once ERT having been broadcasted. For example, in case that the importance of news varies and news formerly considered to be the top news should be eliminated from the top news, description of ERT comes to be changed.

When ERT has been broadcasted, CPU 26 refers to the version number of ERT concerned and determines whether ERT corresponding to the former version number is received already. When it is received already, CPU 26 updates ERT already accumulated in first demultiplexer 23 to new ERT.

After that, CPU 26 presents a user that contents of ERT is changed and asks the treatment of the local event associated with the changed ERT. For example, when a certain news is presented to slip out of the top news, a user can indicate that the news should be eliminated from the reserved recording list.

A description is made of action of digital broadcasting receiver 2 in case of changing the contents of ERT once ERT having been broadcasted and changing a part of the local event. For example, when the news which was not considered to be the top news formerly is changed to the top news, digital broadcasting station 1 broadcasts changed ERT and also broadcasts LIT and ITT related to the new top news.

CPU 26 of digital broadcasting receiver 2 refers to the version number of ERT that has been broadcasted and determines whether ERT corresponding to the former version number is received already. When it is received already, CPU 26 updates ERT already accumulated in first demultiplexer 23 to new ERT.

After that, CPU 26 extracts detailed information related to the local event from LIT and ITT and informs a user that description of ERT is changed and asks the treatment of the local event associated with the changed ERT. For example, when having informed that a certain news was added to the top news, a user can indicate that the news should be added to the reserved recording list.

As described above, according to this third embodiment, ERT is identified not only by the event relation identification but also the second unique information. Therefore, even if ERT is not broadcasted within 24 hours after closing of the broadcast, ERT can be identified surely by the digital broadcasting receiver. Besides, since LIT and ITT describes not only the event identification but also the first unique information, the local event defined to have a relationship by ERT can be identified uniquely. Therefore, the digital broadcasting station can broadcast ERT at any timing. So the time constraints of broadcast timings of ERT can be reduced largely in the digital broadcasting station.

In addition, ERT is identified uniquely for a long term and the program and/or the local event which is defined to have a relationship to ERT is identified uniquely for a long term. Therefore, the operation of recording, reproducing and erasing of the related programs and/or only the local event can be realized without being added time constraints. So it is made possible to plan a great improvement in services to users.

Fourth Embodiment

Figure 7:
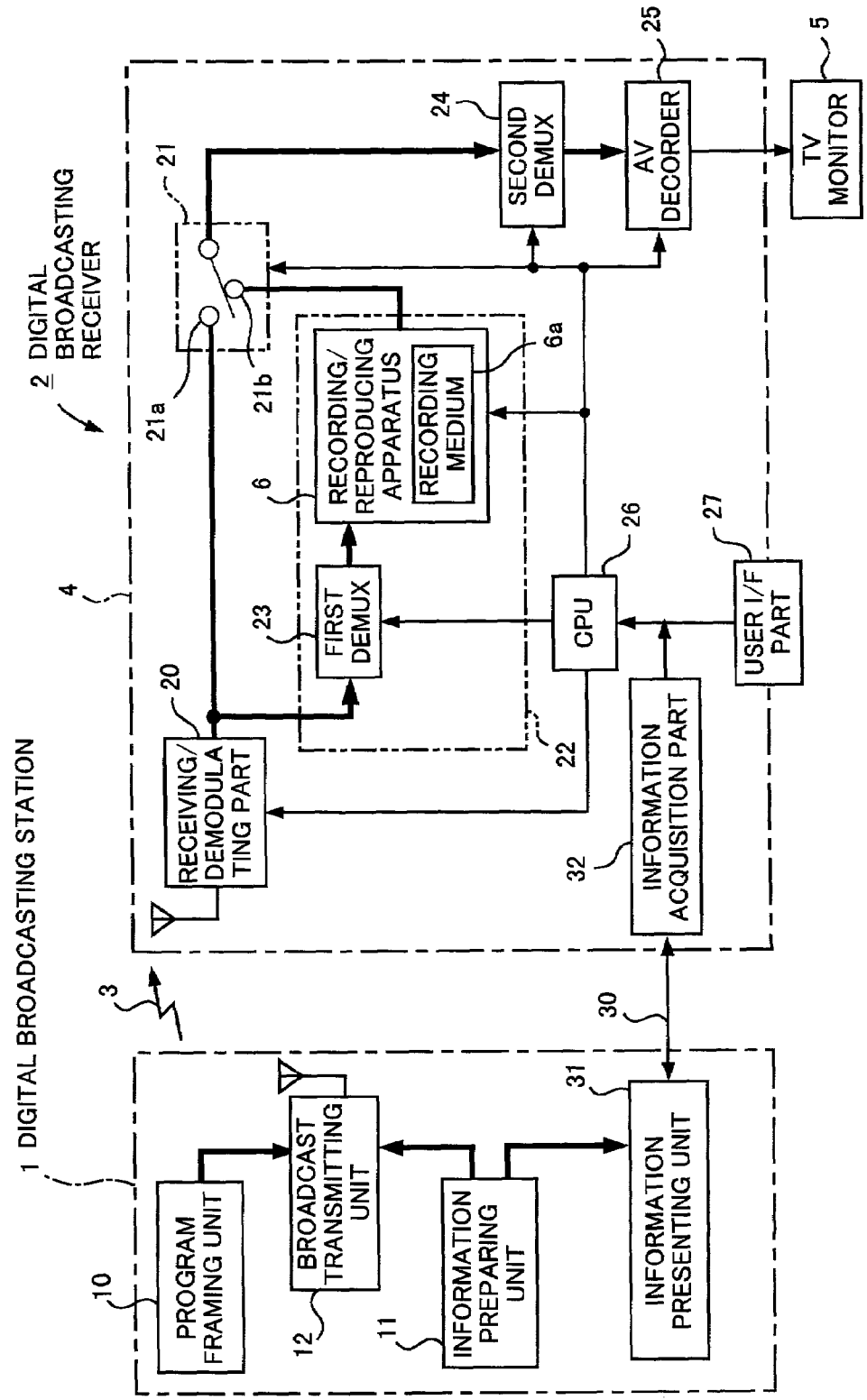
FIG. 7 is a block diagram showing the architecture of digital broadcasting system related to the fourth embodiment of the invention.

FIG. 7 is the block diagram showing the architecture of digital broadcasting system related to the fourth embodiment of the present invention. In FIG. 7, the reference numerals designating corresponding function or parts are the same as those in FIG. 4.

In the above-mentioned first to third embodiment, main part of program, program arrangement information and program extended information are provided as digital broadcasting signal to digital broadcasting receiver 2 via broadcasting channel 3. As opposed to that, in the fourth embodiment, communication channel 30 differing from the broadcasting channel is used for providing the program extended information to digital broadcasting signal receiver 2, in addition to that digital broadcasting signal is provided with the aid of broadcasting channel 3.

With this architecture, moving image, static image, audio and data information that explain program contents in more detail or display associated information arranged in a form making users easier to utilize by modifying those moving image etc. are presented to users besides broadcast. Therefore, new service arrangement to improve further the convenience of user's watching is provided to users. In addition, as only the program extended information is transmitted over communication channel 30, the business form for example to entrust other down load suppliers rather than the broadcaster providing program contents with delivering of program extended information can be realized.

Explaining in more detail about the architecture of digital broadcasting system related to this fourth embodiment, digital broadcasting station 1 comprises information presenting unit 31. Information presenting unit 31 has a function capable of communicating with digital broadcasting receiver 2 over communication channel 30 other than broadcasting channel. For instance Internet and common carrier leased line can be applied as communication channel other than broadcasting channel. Additionally, either wireless or wired are applicable as for the communication channel other than broadcasting channel.

Information presenting unit 31 provides the program extended information including LIT and ITT to digital broadcasting receiver 2. To be more concrete, program extended information comes to be given to information presenting unit 31 from information preparation unit 11. Information presenting unit 31 generates digital communication signal by executing modulation process based on this given program extended information. Information presenting unit 31 transmits the generated digital communication signal to digital broadcasting receiver 2 over communication channel 30.

Digital broadcasting receiver 2 comprises information acquisition part 32. Information acquisition part 32 acquires the program extended information over communication channel 30. Information acquisition part 32 decodes the acquired program extended information and holds the program extended information for making them accessible in CPU 26. In addition, information acquisition part 32 comes to inform by interruption process to CPU 26 that the program extended information has been acquired.

Incidentally, when making digital communication signal, it is not required to use packet type in consideration of mapping to the MPEG transport packet like in the case of employing broadcasting channel 3. However, if similar packet type is adopted in the case of using broadcasting channel 3, the cost of developing each control software of digital broadcasting receiver 2 is reduced. Therefore, it is desirable to make the digital communication signal having the packet type mentioned as above.

FIG. 8 is the illustration of table format to show architecture of the program extended information related to the fourth embodiment. It is not always necessary to be based on ARIB standard in such a case using broadcasting channel for presenting program extended information via communication channel 30. Therefore, in the fourth embodiment, original table is employed as the table for information presenting unit 31 rather than the table based on ARIB standard such as LIT, ITT and ERT.

To be more concrete, information preparation unit 11 makes event information table in a program aside from LIT and ITT. Local event information table includes event identification (event_id). Event identification is expressed by 32 bits rather than 16 bits. In other words, since the local event information table need not be based on ARIB standard, it is made possible to express the identification information including a program and its broadcasting date in one event identification which was difficult for current ARIB standard using 16 bits expression.

As for the presenting form of the program extended information over communication channel 30, a form for example using a homepage of Internet may be available. Explaining in more detail, information presenting unit 31 of digital broadcasting station 1 holds the program extended information made by information preparation unit 11 in the condition that they can be downloaded from Internet. In this case, information presenting unit 31 accumulates the program extended information as BML (Broadcast Markup Language) data or HTML (Hyper Text Markup Language) data. When received the indication of download from digital broadcasting receiver 2, information presenting unit 31 transmits the program extended information over communication channel 30.

On the other hand, CPU 26 of digital broadcasting receiver 2 investigates whether there was updating of the program associated information every predetermined search cycle. To be more concrete, CPU 26 indicates a search for the program extended information to information acquisition part 32 every search cycle. Information acquisition part 32 accesses the homepage of digital broadcasting station 1 in response to this indication and examines whether the program extended information is updated. If the program extended information is updated, information acquisition part 32 calls for download of the program extended information to digital broadcasting station 1.

Upon receipt of requirement of the download, information presenting unit 31 of digital broadcasting station 1 transmits digital communication signal including the indicated program extended information to digital broadcasting receiver 2 over communication channel 30. When received this digital communication signal, information acquisition part 32 extracts and holds the program extended information in the digital communication signal and notifies CPU 26 of information acquisition. CPU 26 reads the program extended information held as above in response to this notice and displays this program extended information on TV monitor 5. In this case, it is displayed for example as BML or HTML browser screen on TV monitor 5.

Incidentally, a storage destination of the program extended information is not the homepage of digital broadcasting station 1 but it may of course be another homepage which the broadcaster specified.

Additionally, in the description as above, CPU 26 persecutes acquisition process of the program extended information automatically. However, acquisition of the program extended information may be processed if only user makes a acquisition requirement of the program extended information.

As described above, according to the fourth embodiment, program extended information is provided to digital broadcasting receiver 2 over communication channel 30 differing from broadcasting channel 3 in addition to providing digital broadcasting signal with the aid of broadcasting channel 3. Therefore, the display associated information having a form that user can easily utilize such as moving picture explaining contents of the program in more details can be provided to users besides broadcasting. As a consequence, new service arrangement to improve further the convenience of user's watching can be provided. In addition, since only the program extended information is transmitted over communication channel 30, business form for example entrusting other down load suppliers rather than the broadcaster providing the program contents with delivering of the program extended information can be realized.

Incidentally, the explanation as above is illustrated as an example that LIT and ITT is communicated over communication channel 30 other than broadcasting channel. However, it may of course be permissible for example that ERT is communicated over communication channel 30 other than broadcasting channel 3. In this case, information preparation unit 11 gives a table of the relation information between events having the same function with ERT to information presenting unit 31. Information presenting unit 31 transmits the table of the relation information between events to digital broadcasting receiver 2 over communication channel 30. The table of the relation Information between events includes event relation identification (event_relation_id) as shown in FIG. 9. Event relation identification is expressed by 32 bits rather than 16 bits. Therefore, the table of the relation information between events can be identified uniquely only by this event relation identification.

Fifth Embodiment

Figure 10:
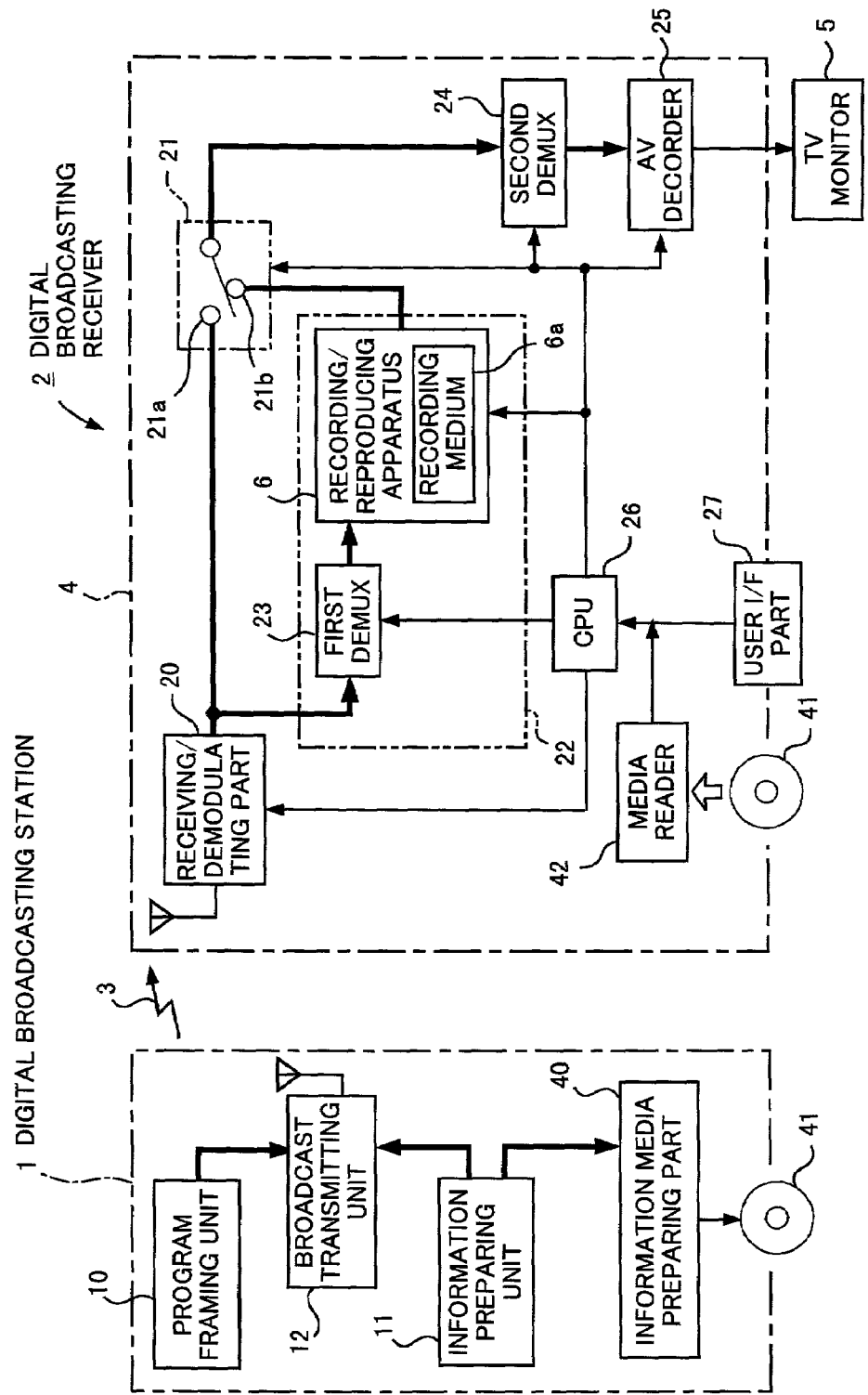
FIG. 10 is a block diagram showing the architecture of digital broadcasting system related to the fifth embodiment of the invention.

FIG. 10 is the block diagram showing the architecture of digital broadcasting system related to the fifth embodiment of the invention. In FIG. 10, reference numerals designating corresponding function or parts are the same as those in FIG. 4.

In the fourth embodiment as above, program extended information is provided to digital broadcasting receiver 2 over communication channel 30. As opposed to that, in the fifth embodiment, program extended information is provided to digital broadcasting receiver 2 with the aid of other information transmitting means.

Explaining in more detail, digital broadcasting station 1 related to this fifth embodiment comprises information media framing unit 40. Information media framing unit 40 records the program extended information provided from information preparation unit 11 in package media 41. For example, information media framing unit 40 is a CD-ROM writer and in this case package media 41 is CD-ROM. Program extended information provided from information preparation unit 11 is the program extended information including the local event information table in the fourth embodiment and/or the table of the relation identification between events.

On the other hand, digital broadcasting receiver 2 comprises media reader 42. Media reader 42 can read recorded contents of package media 41. In case that package media 41 is CD-ROM, media reader 42 is a CD-ROM drive. Media reader 42 accumulates program extended information read from package media 41 and makes them available in CPU 26. In other words, CPU 26 acquires program extended information from media reader 42 and displays the program extended information on TV monitor 5 after having converted them into graphical data.

Incidentally, package media 41 is dispatched to digital broadcasting receiver 2 by means of mail correspondence from digital broadcasting station 1. As thus described, even if package media 41 is dispatched to digital broadcasting receiver 2 by means of mail correspondence etc., since the first unique information and/or the second unique information is described in the program extended information, the digital broadcasting program and/or ERT can be identified uniquely.

As described above, according to the fifth embodiment, digital broadcasting receiver 2 that does not comprise communication environment such as Internet can provide the display associated information having a form easy for utilizing by users such as moving picture explaining the program contents in more detail. Therefore, new service arrangement to improve further the convenience of user's watching is provided. In addition, since only the program extended information is transmitted over the communication channel, business form entrusting other down load suppliers rather than the broadcaster providing program contents with delivering of the program extended information can be realized.

What is claimed is:

1. A digital broadcasting system comprising:
    a digital broadcasting station, said station including:
        a program framing unit for framing digital broadcasting programs including local events;
        an information preparation unit for making program extended information having a first table describing detailed information of the local events included in said digital broadcasting programs, said table including a first unique identifier field corresponding to each local event and an event identification field including information identifying a digital broadcasting program; and
        a broadcast transmission unit for broadcasting a digital broadcasting signal, wherein the framed digital broadcasting programs and said program extended information are multiplexed in said digital broadcasting signal; and a digital broadcasting receiver, said digital broadcasting receiver including:
  a receiving unit for receiving the digital broadcasting signal;
  a recording unit for recording a digital broadcasting program included in said received digital broadcasting signal;
  a program identification unit for identifying the digital broadcasting program based on information included in the event identification information field and the first unique identifier field of the first table of the program extended information included in said received digital broadcasting signal; and
  a local event processing unit for processing a selected local event included in the digital broadcasting program identified by said program identification unit from among the digital broadcasting programs included in said digital broadcasting signal and the digital broadcasting programs recorded by said recording unit according to the detailed information described in said first table.

2. The digital broadcasting system of claim 1 wherein said first unique identifier field includes data representing a broadcasting date of a corresponding digital broadcasting program, identification information particular to a corresponding digital broadcasting program, or a pseudorandom number.

3. The digital broadcasting system of claim 1 wherein said first table is a local event information table (LIT) or an information transmission table (ITT).

4. The digital broadcasting system of claim 1 wherein:
said program extended information further includes a second table describing the relationship between a plurality of digital broadcasting programs or a plurality of local events, said second table including an event relation identification field, a second unique identifier field, and a descriptor related to both said first and second table, said descriptor including said second unique identifier field,
said digital broadcasting receiver further includes a relation identification unit for identifying said second table based on information included in said event relation identification field and said second unique identifier field described in said descriptor, and
said program identification unit identifies each of the plurality of digital broadcasting programs described as having a relationship with the selected local event in said second table identified by said relation identification unit based on information included in the event relation identification field and the first unique identifier field described in said first table.

5. The digital broadcasting system of claim 4 wherein said second unique identifier field includes data representing is an updating date of said second table, identification information particular to a corresponding digital broadcasting program, or a pseudorandom number.

6. The digital broadcasting system of claim 4 wherein said second table is an event relation table (ERT).

7. The digital broadcasting system of claim 1 wherein:
said digital broadcasting station further includes an information presenting unit for providing said program extended information over a communication channel other than a broadcasting channel,
said digital broadcasting receiver further includes an information acquisition unit for acquiring the program extended information via said communication channel, and
said program identification unit utilizes information within the event identification field and the first unique identifier field in the program extended information acquired by said information acquisition part for program identification.

8. The digital broadcasting system of claim 1 wherein:
said digital broadcasting station further includes an information media framing unit for recording said program extended information in package media,
said digital broadcasting receiver further includes a media reader for reading the program extended information recorded in said package media; and
said program identification unit utilizes information within the event identification field and the first unique identifier field in the program extended information read from said media reader for program identification.

9. A broadcasting station for transmitting digital broadcasting programs including local events to at least one digital broadcasting receiver that receives digital broadcasting signals and identifies a digital broadcasting program based on identification information described in a first table of program extended information included in said digital broadcasting signals, and processes a selected local event in said identified digital broadcasting program, said station comprising:
  a program framing unit for framing the digital the broadcasting programs including the local events;
  an information preparation unit for preparing program extended information having a first table describing detailed information of the local events included in said digital broadcasting programs, said first table including a first identifier field and an event identification field including information identifying a corresponding digital broadcasting program for each local event; and
  a broadcast transmission unit for broadcasting a digital broadcasting signal, wherein said framed digital broadcasting programs and said program extended information are multiplexed in said digital broadcasting signal.

10. A digital broadcasting receiver for receiving digital broadcasting signals, wherein digital broadcasting programs and a program extended information are multiplexed in said digital broadcasting signals, and said program extended information includes a first table describing detailed information of corresponding digital broadcasting programs, said first table including event identification information identifying a corresponding digital broadcasting program and a first unique identifier, said receiver comprising:
  a recording unit for recording a digital broadcasting program included in said received digital broadcasting signals;
  a program identification unit for identifying the digital broadcasting program based on information included in the event identification field and the first unique field in said first table; and
  a local event processing unit for processing a selected local event included in the digital broadcasting program identified by said identification unit from among the digital broadcasting programs included in said received digital broadcasting program and the recorded digital broadcasting programs recorded by said recording unit based on the detailed information described in said first table.

11. A method of processing local events included in digital broadcasting signals, the method comprising:

receiving a digital broadcasting signal including framed digital broadcasting programs including local events multiplexed with program extended information;

accessing a first table describing detailed information of local events included in said digital broadcasting programs;

identifying a digital broadcasting program associated with a selected local event based on information contained in an event identification field and a first unique identifier field in the first table;

determining whether or not the identified digital broadcasting program has previously been broadcast;

determining when the identified digital broadcasting program is to be broadcast, if it is determined that the digital broadcasting program has not been previously broadcast;

recording the identified digital broadcasting program when it is broadcast; and extracting the selected local event from the identified digital broadcasting program from among recorded programs.

* * * * *